United States Patent
Park

(10) Patent No.: US 11,928,475 B2
(45) Date of Patent: Mar. 12, 2024

(54) FAST RECOVERY FOR DUAL CORE LOCK STEP

(71) Applicant: Ceremorphic, Inc., San Jose, CA (US)

(72) Inventor: Heonchul Park, Pleasanton, CA (US)

(73) Assignee: Ceremorphic, Inc., San Jose, CA (US)

( * ) Notice: Subject to any disclaimer, the term of this patent is extended or adjusted under 35 U.S.C. 154(b) by 48 days.

(21) Appl. No.: 17/519,588

(22) Filed: Nov. 5, 2021

(65) Prior Publication Data

US 2023/0143422 A1     May 11, 2023

(51) Int. Cl.
| | |
|---|---|
| G06F 9/30 | (2018.01) |
| G06F 9/38 | (2018.01) |
| G06F 11/16 | (2006.01) |

(52) U.S. Cl.
CPC ........ *G06F 9/3869* (2013.01); *G06F 11/1629* (2013.01); *G06F 11/1695* (2013.01)

(58) Field of Classification Search
CPC . G06F 9/3869; G06F 11/1629; G06F 11/1695
See application file for complete search history.

(56) References Cited

U.S. PATENT DOCUMENTS

| | | | | |
|---|---|---|---|---|
| 6,092,217 A | * | 7/2000 | Kanekawa | G05B 9/03 |
| | | | | 714/E11.01 |
| 11,424,621 B2 | * | 8/2022 | Jain | H01L 27/0805 |
| 2004/0239397 A1 | | 12/2004 | Mudge et al. | |
| 2008/0244305 A1 | * | 10/2008 | Troppmann | G06F 11/1641 |
| | | | | 712/30 |
| 2013/0238945 A1 | * | 9/2013 | Vilela | G06F 11/1695 |
| | | | | 714/49 |
| 2014/0115401 A1 | * | 4/2014 | Ito | G06F 11/10 |
| | | | | 714/37 |
| 2017/0102950 A1 | | 4/2017 | Chamberlain et al. | |
| 2018/0365014 A1 | | 12/2018 | Lin | |
| 2022/0206065 A1 | * | 6/2022 | Viswanathan Pillai | G06F 7/02 |

OTHER PUBLICATIONS

Sim et al.; A Dual Lockstep Processor System-on-a-Chip for Fast Error Recovery in Safety-Critical Applications; 2020; IEEE (Year: 2020).*
Search report, PCT/US23/16561.

* cited by examiner

*Primary Examiner* — Corey S Faherty
(74) *Attorney, Agent, or Firm* — File-EE-Patents.com; Jay A. Chesavage

(57) ABSTRACT

An exemplary fault-tolerant computing system comprises a secondary processor configured to execute in delayed lock step with a primary processor from a common program store, comparators in the store data and writeback paths to detect a fault based on comparing primary and secondary processor states, and a writeback path delay permitting aborting execution when a fault is detected, before writeback of invalid data. The secondary processor execution and the primary processor store data and writeback may be delayed a predetermined number of cycles, permitting fault detection before writing invalid data. Store data and writeback paths may include triple module redundancy configured to pass only majority data through the store data and writeback path delay stages. Some implementations may forward data from the store data path delay stages to the writeback stage or memory if the load data address matches the address of data in a store data path delay stage.

17 Claims, 7 Drawing Sheets

FAST RECOVERY FOR DUAL CORE LOCK STEP

CROSS-REFERENCE TO RELATED APPLICATIONS

None.

TECHNICAL FIELD

This disclosure relates generally to fault-tolerant computing.

BACKGROUND

Fault-tolerant computing is computer-implemented processing in the presence of a fault. A processing fault may result from a hardware error. For example, a failing hardware component such as a defective memory device may result in a processor reading invalid data. Such an invalid data read may result in system state corruption. For example, a processor reading invalid data may then generate invalid data that may corrupt the system when written to memory. In some cases, an environmental factor such as a cosmic ray may corrupt data and result in a processing fault. Some computing systems operate in mission critical roles. A computing system operating in a safety critical application may need to be halted when a fault is detected, to prevent a catastrophic result. Recovering safe and correct system operation after a fault is detected may be time-consuming or difficult.

SUMMARY

An exemplary fault-tolerant computing system comprises a secondary processor configured to execute in delayed lock step with a primary processor from a common program store, comparators in the store data and writeback paths to detect a fault based on comparing primary and secondary processor states, and a writeback path delay permitting aborting execution when a fault is detected, before writeback of invalid data. The secondary processor execution and the primary processor store data and writeback may be delayed a predetermined number of cycles, permitting fault detection before writing invalid data. Store data and writeback paths may include triple module redundancy configured to pass only majority data through the store data and writeback path delay stages. Some implementations may forward data from the store data path delay stages to the writeback stage or memory if the load data address matches the address of data in a store data path delay stage.

An example implementation in accordance with the present disclosure may comprise a primary processor and a secondary processor. The primary processor and the secondary processor may be pipelined processors. The primary processor pipeline and the secondary processor pipeline may comprise a respective plurality of sequential pipeline stages. The primary and secondary processor pipelines may comprise, in sequence, a fetch stage, a decode stage, an execute stage, a load/store stage, and a writeback stage. The primary and secondary processor pipeline load/store stages may be operably coupled to respective data memories. The primary and secondary processor pipeline writeback stages may be operably coupled to respective writeback caches. The primary and secondary processor pipeline store data paths comprise a delay module connected between the execute and load/store stages of the respective pipelines. The primary processor pipeline store data path delay may be a three-stage delay. The secondary processor pipeline store data path delay may be a one-stage delay, permitting the secondary processor to execute from a common program store with the primary processor, delayed by two cycles from the primary processor. A store data comparator receives delayed input signals and data from the primary and secondary processor pipelines. The store data comparator is configured to output the result of comparing the delayed input signals and data from the primary and secondary processors. The output of the store data path comparator indicates whether the primary processor and secondary processor states agree. When the primary processor and secondary processor states do not agree, the store data path comparator output indicates a fault is present. The store data path comparator output is connected to a control gate configured to govern memory write operation through the load/store stage and block memory write when a fault is present. The delayed lock step execution between the processors and the store data path delays permit preventing system state corruption before invalid data is written to memory, based on blocking a memory write operation while invalid data is still in the store data path delay stages.

In another example implementation in accordance with the present disclosure the primary and secondary processor pipeline writeback paths comprise a delay module connected between the load/store and writeback stages of the respective pipelines. The primary processor pipeline writeback path delay may be a three-stage delay. The secondary processor pipeline writeback path delay may be a one-stage delay, permitting the secondary processor to execute from a common program store with the primary processor, delayed by two cycles from the primary processor. A writeback comparator receives delayed input signals and data from the primary and secondary processor pipelines. The writeback comparator is configured to output the result of comparing the delayed input signals and data from the primary and secondary processors. The output of the writeback path comparator indicates whether the primary processor and secondary processor states agree. When the primary processor and secondary processor states do not agree, the writeback path comparator output indicates a fault is present. The writeback path comparator output is connected to a control gate configured to govern writeback operation through the writeback stage and block writeback when a fault is present. The delayed lock step execution between the processors, the store data path delay, and the writeback delay permit preventing system state corruption before invalid data is written to memory or to the writeback cache, based on blocking memory write and writeback operations while invalid data is still in the store data path and writeback path delay stages.

In another example implementation in accordance with the present disclosure the delay module configured in the primary processor pipeline writeback data path may comprise multiple buffer stages configured with triple module redundancy designed to pass only majority data to the next stage.

In another example implementation in accordance with the present disclosure the primary processor pipeline and the secondary processor pipeline store data paths may be configured to forward data from the store data path delay stages to the writeback stage or memory if the load data address matches the address of data in a store data path delay stage.

Various implementations may achieve one or more technical effect. For example, some implementations may improve fault detection reliability. This facilitation may be a result of fault detection implemented in the store data stage and the writeback stage, increasing the likelihood of fault detection with multiple comparisons. In some implementations, fault recovery may be faster, based on resuming execution from a known clean point that may have been more recently passed by a program. Such faster fault recovery may be a result of preventing system state corruption before invalid data is written to memory, register file, or to the writeback cache, permitting resuming execution at a more recent clean point determined based on known good data in the delay stages. An implementation in accordance with the present disclosure may ensure data agreement between two processor cores before write back into a register file or data store to memory, permitting recovery time to be reduced on a fault detection. In an illustrative example, fast recovery from a fault may be performed as follows when a mismatch between the primary core pipeline and secondary core pipeline is detected before writeback by a store data comparator or writeback comparator as disclosed herein: the pipeline is flushed and the pipeline begins fetching the instruction where the mismatch occurred, from the instruction memory. Since the pipeline was flushed before writeback, the detected invalid data was not written to the register file, thus protecting the register file from corruption. As a result of preventing register file corruption, the instructions needed to recover quickly may be in cache with very high probability, and the cycle loss to recover normal execution may be less than 10 cycles using the fault-tolerant fast recovery techniques according to the present disclosure.

In an aspect, an apparatus may comprise: a primary processor comprising a primary processor pipeline, wherein the primary processor pipeline comprises an execute stage and a load/store stage; a secondary processor comprising a secondary processor pipeline, wherein the secondary processor pipeline comprises an execute stage and a load/store stage; a store data comparator having a first input operably coupled with the primary processor pipeline, a second input operably coupled with the secondary processor pipeline, and an output, wherein the store data comparator is configured to indicate at the output a result of comparing delayed primary processor pipeline signals with delayed secondary processor pipeline signals; a primary processor pipeline store data control gate configured to output delayed primary processor pipeline signals to the primary processor pipeline load/store stage only if the store data comparator output indicates agreement between the delayed primary processor pipeline signals and the delayed secondary processor pipeline signals compared by the store data comparator; and a secondary processor pipeline store data control gate configured to output delayed secondary processor pipeline signals to the secondary processor pipeline load/store stage only if the store data comparator output indicates agreement between the delayed primary processor pipeline signals and the delayed secondary processor pipeline signals compared by the store data comparator.

The primary processor pipeline execute stage may have an output operably connected through a primary processor pipeline store data path delay module to a first input of the primary processor store data control gate.

The primary processor pipeline store data path delay module may be a three-stage buffer delay module.

The primary processor pipeline store data path delay module may be a three-stage triple module redundancy buffer delay module wherein each stage may be configured to pass only majority data.

The primary processor pipeline may further comprise a writeback stage, wherein the primary processor pipeline may be configured to forward data from the primary processor pipeline store data path delay module to the writeback stage if a load data address matches the address of data in the primary processor pipeline store data path delay module.

The secondary processor pipeline execute stage may have an output operably connected through a secondary processor pipeline store data path delay module to a first input of the secondary processor store data control gate.

The secondary processor pipeline store data path delay module may be a one-stage buffer delay module.

The delayed primary processor pipeline signals compared by the store data comparator may be connected to the store data comparator first input through a primary processor store data comparison delay module operably coupled to the primary processor pipeline execute stage.

The primary processor store data comparison delay module may be a three-stage buffer delay module.

In another aspect, an apparatus may comprise: a primary processor comprising a primary processor pipeline, wherein the primary processor pipeline comprises, operably connected in sequence, a fetch stage, a decode stage, an execute stage, a load/store stage, and a writeback stage; a secondary processor comprising a secondary processor pipeline, wherein the secondary processor pipeline comprises, operably connected in sequence, a fetch stage, a decode stage, an execute stage, a load/store stage, and a writeback stage; a store data comparator having a first input operably coupled with an output of the primary processor pipeline execute stage to receive delayed primary processor pipeline signals through a primary processor store data comparison delay module comprising a three-stage buffer delay, a second input operably coupled with the secondary processor pipeline execute stage to receive delayed secondary processor pipeline signals through a secondary processor store data comparison delay module comprising a one-stage buffer delay, and an output, wherein the store data comparator is configured to indicate at the output a result of comparing the delayed primary processor pipeline signals with the delayed secondary processor pipeline signals; a primary processor pipeline store data control gate having a first input, a second input, and an output, wherein the first input is operably coupled with an output of the primary processor pipeline execute stage to receive delayed primary processor pipeline signals through a primary processor store data path delay module comprising a three-stage buffer delay, wherein the second input is operably coupled with the store data comparator output, and the primary processor pipeline store data control gate is configured to output the delayed primary processor pipeline store data path signals to the primary processor pipeline load/store stage only if the store data comparator output indicates agreement between the delayed primary processor pipeline signals and the delayed secondary processor pipeline signals compared by the store data comparator, and wherein the primary processor pipeline is configured to forward data from the primary processor pipeline store data path delay module to the writeback stage or a memory if a load data address matches the address of data in the primary processor pipeline store data path delay module; a secondary processor pipeline store data control gate having a first input, a second input, and an output, wherein the first input is operably coupled with an output of the secondary processor pipeline execute stage to receive delayed secondary processor pipeline signals through a secondary processor store data path delay module comprising a one-stage buffer delay, wherein the second input is operably coupled with the store data comparator output, and the secondary processor pipeline store data control gate is configured to output the delayed secondary processor pipeline store data path signals to the secondary processor pipeline load/store stage only if the store data comparator output indicates agreement between the delayed primary processor pipeline signals and the delayed secondary processor pipeline signals compared by the store data comparator, and wherein the secondary processor pipeline is configured to forward data from the secondary processor pipeline store data path delay module to the writeback stage or a memory if a load data address matches the address of data in the secondary processor pipeline store data path delay module; a writeback comparator having a first input operably coupled with an output of the primary processor pipeline load/store stage to receive delayed primary processor pipeline signals through a primary processor writeback comparison delay module comprising a three-stage buffer delay, a second input operably coupled with the secondary processor pipeline load/store stage to receive delayed secondary processor pipeline signals through a secondary processor writeback comparison delay module comprising a one-stage buffer delay, and an output, and wherein the writeback comparator is configured to indicate at the output a result of comparing the delayed primary processor pipeline signals with the delayed secondary processor pipeline signals; a primary processor pipeline writeback control gate having a first input, a second input, and an output, wherein the first input is operably coupled with an output of the primary processor pipeline load/store stage to receive delayed primary processor pipeline signals through a primary processor writeback path delay module comprising a three-stage buffer delay, and wherein the second input is operably coupled with the writeback comparator output, and the primary processor pipeline writeback control gate is configured to output the delayed primary processor pipeline writeback signals to the primary processor pipeline writeback stage only if the writeback comparator output indicates agreement between the delayed primary processor pipeline signals and the delayed secondary processor pipeline signals compared by the writeback comparator; and a secondary processor pipeline writeback control gate having a first input, a second input, and an output, wherein the first input is operably coupled with an output of the secondary processor pipeline load/store stage to receive delayed secondary processor pipeline signals through a secondary processor writeback path delay module comprising a one-stage buffer delay, and wherein the second input is operably coupled with the writeback comparator output, and the secondary processor pipeline writeback control gate is configured to output the delayed secondary processor pipeline writeback signals to the secondary processor pipeline writeback stage only if the writeback comparator output indicates agreement between the delayed primary processor pipeline signals and the delayed secondary processor pipeline signals compared by the writeback comparator.

The primary processor pipeline fetch stage and the secondary processor pipeline fetch stage may be operably coupled to a program store common to the primary processor and the secondary processor.

The secondary processor pipeline may execute in delayed lock step with the primary processor pipeline, wherein the secondary processor pipeline execution is delayed from the primary processor pipeline execution by at least two cycles.

The delayed primary processor pipeline signals and the delayed secondary processor pipeline signals compared by the store data comparator may further comprise handshake signals and data between a data cache and a core, or handshake signals between a data memory and the core.

The delayed primary processor pipeline signals and the delayed secondary processor pipeline signals compared by the writeback comparator may further comprise handshake signals and data between a register file, a data cache, a data memory, and a core.

The primary processor pipeline store data path delay module may further comprise a three-stage triple module redundancy buffer delay module wherein each stage may be configured to pass only majority data.

The primary processor pipeline writeback path delay module may further comprise a three-stage triple module redundancy buffer delay module wherein each stage may be configured to pass only majority data.

In another aspect, an apparatus may comprise: a primary processor comprising a primary processor pipeline, wherein the primary processor pipeline comprises, operably connected in sequence, a fetch stage, a decode stage, an execute stage, a load/store stage, and a writeback stage; a secondary processor comprising a secondary processor pipeline, wherein the secondary processor pipeline comprises, operably connected in sequence, a fetch stage, a decode stage, an execute stage, a load/store stage, and a writeback stage, wherein the primary processor pipeline fetch stage and the secondary processor pipeline fetch stage are operably coupled to a program store common to the primary processor and the secondary processor; a store data comparator having a first input operably coupled with an output of the primary processor pipeline execute stage to receive delayed primary processor pipeline signals through a primary processor store data comparison delay module comprising a three-stage buffer delay, a second input operably coupled with the secondary processor pipeline execute stage to receive delayed secondary processor pipeline signals through a secondary processor store data comparison delay module comprising a one-stage buffer delay, and an output, wherein the store data comparator is configured to indicate at the output a result of comparing the delayed primary processor pipeline signals with the delayed secondary processor pipeline signals, and wherein the delayed primary processor pipeline signals and the delayed secondary processor pipeline signals compared by the store data comparator further comprise handshake signals and data between a data cache and a core, and handshake signals between a data memory and the core; a primary processor pipeline store data control gate having a first input, a second input, and an output, wherein the first input is operably coupled with an output of the primary processor pipeline execute stage to receive delayed primary processor pipeline signals through a primary processor store data path delay module comprising a three-stage triple module redundancy buffer delay wherein each stage is configured to pass only majority data, wherein the second input is operably coupled with the store data comparator output, and the primary processor pipeline store data control gate is configured to output the delayed primary processor pipeline store data path signals to the primary processor pipeline load/store stage only if the store data comparator output indicates agreement between the delayed primary processor pipeline signals and the delayed secondary processor pipeline signals compared by the store data comparator, and wherein the primary processor pipeline is configured to forward data from the primary processor pipeline store data path delay module to the writeback stage if a load data address matches the address of data in the primary processor pipeline store data path delay module buffer stages; a secondary processor pipeline store data control gate having a first input, a second input, and an output, wherein the first input is operably coupled with an output of the secondary processor pipeline execute stage to receive delayed secondary processor pipeline signals through a secondary processor store data path delay module comprising a one-stage buffer delay, wherein the second input is operably coupled with the store data comparator output, and the secondary processor pipeline store data control gate is configured to output the delayed secondary processor pipeline store data path signals to the secondary processor pipeline load/store stage only if the store data comparator output indicates agreement between the delayed primary processor pipeline signals and the delayed secondary processor pipeline signals compared by the store data comparator, and wherein the secondary processor pipeline is configured to forward data from the secondary processor pipeline store data path delay module to the writeback stage if a load data address matches the address of data in the secondary processor pipeline store data path delay module; a writeback comparator having a first input operably coupled with an output of the primary processor pipeline load/store stage to receive delayed primary processor pipeline signals through a primary processor writeback comparison delay module comprising a three-stage buffer delay, a second input operably coupled with the secondary processor pipeline load/store stage to receive delayed secondary processor pipeline signals through a secondary processor writeback comparison delay module comprising a one-stage buffer delay, and an output, and wherein the writeback comparator is configured to indicate at the output the result of comparing the delayed primary processor pipeline signals with the delayed secondary processor pipeline signals, and wherein the delayed primary processor pipeline signals and the delayed secondary processor pipeline signals compared by the writeback comparator further comprise handshake signals and data between a register file, a data cache, a data memory, and a core; a primary processor pipeline writeback control gate having a first input, a second input, and an output, wherein the first input is operably coupled with an output of the primary processor pipeline load/store stage to receive delayed primary processor pipeline signals through a primary processor writeback path delay module comprising a three-stage triple module redundancy buffer delay wherein each stage is configured to pass only majority data, and wherein the second input is operably coupled with the writeback comparator output, and the primary processor pipeline writeback control gate is configured to output the delayed primary processor pipeline writeback signals to the primary processor pipeline writeback stage only if the writeback comparator output indicates agreement between the delayed primary processor pipeline signals and the delayed secondary processor pipeline signals compared by the writeback comparator; and a secondary processor pipeline writeback control gate having a first input, a second input, and an output, wherein the first input is operably coupled with an output of the secondary processor pipeline load/store stage to receive delayed secondary processor pipeline signals through a secondary processor writeback path delay module comprising a one-stage buffer delay, and wherein the second input is operably coupled with the writeback comparator output, and the secondary processor pipeline writeback control gate is configured to output the delayed secondary processor pipeline writeback signals to the secondary processor pipeline writeback stage only if the writeback comparator output indicates agreement between the delayed primary processor pipeline signals and the delayed secondary processor pipeline signals compared by the writeback comparator.

The program store may further comprise processor executable instructions configured to cause the apparatus to resume execution from a known clean program point in response to a fault indication determined as a function of disagreement between primary processor pipeline signals and secondary processor pipeline signals.

One or more of the primary processor or the secondary processor may further comprise a superscalar processor.

The apparatus may further comprise a C200 processor.

The details of various aspects are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
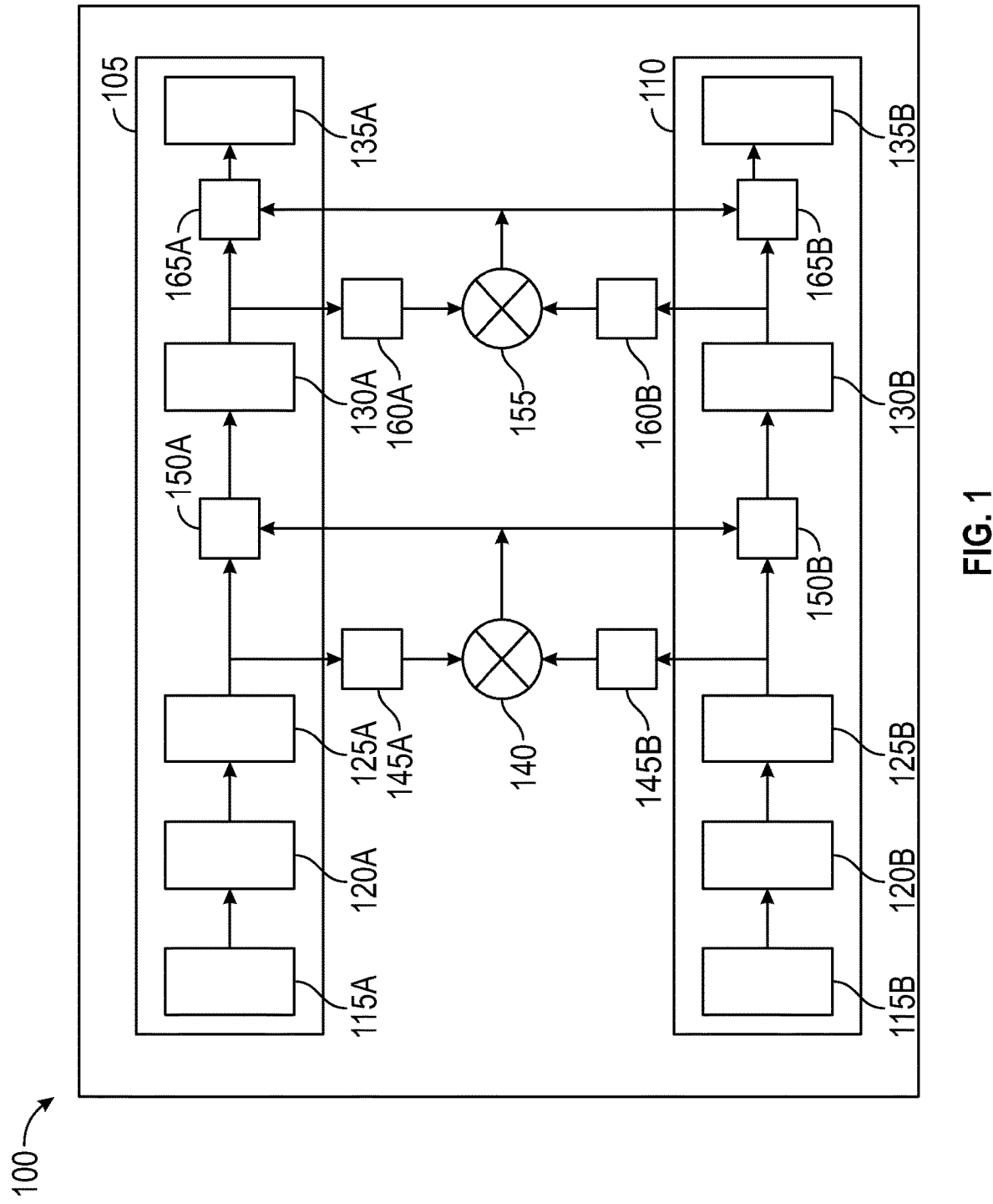
FIG. 1 depicts a block diagram of an exemplary fault-tolerant computing system having delayed lock step execution between primary and secondary processors, a store data path delay, and a writeback path delay, configured to prevent system corruption when a fault is detected based on comparing primary and secondary processor states.

To aid understanding, this document is organized as follows. First, a hierarchical general description distinct from the description of the drawings is presented. Second, fault-tolerant computing system design for fast recovery using delayed lock step execution between primary and secondary processors, a store data path delay, and a writeback path delay, configured to prevent system corruption when a fault is detected based on comparing primary and secondary processor states, is briefly introduced with reference to FIG. 1. Third, with reference to FIGS. 2-4, the discussion turns to exemplary implementations that illustrate fast recovery fault-tolerant computing design. Specifically, fault detection and fast recovery applications using primary processor and secondary processor state comparison, a delayed store data path, and a delayed writeback path are presented. Then, with reference to FIGS. 5-6, exemplary writeback path delay and store data path delay designs are disclosed. Finally, with reference to FIG. 7, an exemplary fault-tolerant computing system implementation is disclosed to present improvements in fault-tolerant computing technology.

In the present disclosure, various features may be described as being optional, for example, through the use of the verb "may;" or, through the use of any of the phrases: "in some implementations," "in some designs," "in various implementations," "in various designs," "in an illustrative example," or, "for example." For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be implemented in seven different ways, namely with just one of the three possible features, with any two of the three possible features or with all three of the three possible features. In particular, it is noted that the respective implementation features, even those disclosed solely in combination with other implementation features, may be combined in any configuration excepting those readily apparent to the person skilled in the art as nonsensical.

The present disclosure teaches a fault-tolerant computing system. The fault-tolerant computing system may comprise at least one processor. The at least one processor may comprise a pipelined processor. The at least one pipelined processor may comprise multiple pipeline stages. Each stage of the multiple pipeline stages may be configured to perform an operation. Each stage of the multiple pipeline stages may be configured with at least one input. Each stage of the multiple pipeline stages may be configured with at least one output. Each stage of the multiple pipeline stages may be configured to perform an operation in one clock period, with the operation result available at the output. One or more stage of the multiple pipeline stages may be a buffer stage configured to pass input to output in one clock period. The at least one pipelined processor may comprise a plurality of pipelines. The at least one pipeline may comprise a fetch stage. The at least one pipeline may comprise a decode stage. The at least one pipeline may comprise an execute (EX)/address generation (AG) stage. The at least one pipeline may comprise a store data stage. The store data stage may be a memory access stage. The at least one pipeline may comprise a writeback stage. The writeback stage may be operably coupled with a writeback cache. The at least one processor may be a superscalar processor. The superscalar processor may comprise multiple processor cores. Each processor core may be implemented using a superscalar architecture. The superscalar processor may be a RISCV processor according to the specification of https:/riscv.org/technical/specifications/. The superscalar processor may be a C200 processor or successor, as described in https://www.intel.com/content/dam/www/public/us/en/documents/specification-updates/6-and-c200-chipset-specification-update.pdf.

The at least one processor may comprise a primary processor. The at least one processor may comprise a secondary processor. The fault-tolerant computing system may comprise a primary processor and a secondary processor. The at least one processor may be implemented as at least one processor core. The primary processor may be implemented as a primary core. The secondary processor may be implemented as a secondary core. The fault-tolerant computing system may be implemented as a dual core computing system. The at least one processor may be operably coupled with a memory. The memory may be an instruction memory. The instruction memory may be a program store. The memory may be a data memory. The memory may comprise an instruction memory and a data memory. The at least one processor may be configured to execute processor executable program instructions from the instruction memory. The at least one processor may be configured to perform operations on data in the data memory. The at least one processor core may be operably coupled with at least one cache. The at least one cache may be a writeback cache. At least one processor may be configured with local data memory. At least one processor may be configured with a data cache. At least one processor may be configured with local data memory and a data cache. Some fault-tolerant computing designs in accordance with the present disclosure may be implemented using a processor without a cache. An implementation in accordance with the present disclosure using a processor without a cache may be configured to apply the disclosed fault detection and fast recovery techniques disclosed herein to a processor having only a data memory and not a cache. The memory may comprise processor executable program instructions and data that jointly program and configure the at least one processor to perform operations. The operations performed by the at least one processor may comprise resuming execution from a known clean program point. The at least one processor may resume execution from the known clean point in response to a fault indication.

The primary processor and the secondary processor may be configured to execute program instructions from the same memory common to the primary processor and the secondary processor. The secondary processor may be configured to execute program instructions from the memory in delayed lock step with the primary processor. One or more processors may be configured with one or more delay module. The one or more delay module may comprise one or more buffer stage. The one or more delay module may comprise a series of buffer stages each configured to pass input to output in one clock period. One buffer stage may delay input to output for one clock cycle.

The fault-tolerant computing system may comprise a store data comparator. The store data comparator may have a first input connected through a delay module to the primary processor pipeline to receive delayed primary processor pipeline signals, a second input connected through a delay module to the secondary processor pipeline to receive delayed secondary processor pipeline signals, and an output. The delay module configured to delay the primary processor pipeline signals input to the store data comparator may be a three-stage delay buffer connected to the primary core execution/address generation stage. The delay module configured to delay the secondary processor pipeline signals input to the store data comparator may be a one-stage delay buffer connected to the secondary core execution/address generation stage.

The primary processor pipeline store data path may be configured with a delay module connecting the primary pipeline execution/address generation stage to the primary pipeline store data/memory access stage. The delay module configured in the primary processor pipeline store data path may be a three-stage delay buffer. The delay module configured in the primary processor pipeline store data path may comprise multiple buffer stages configured with triple module redundancy. The primary processor pipeline store data path may be configured to forward data from the store data path delay stages to the writeback stage or memory if the load data address matches the address of data in a store data path delay stage. The secondary processor pipeline store data path may be configured with a delay module connecting the secondary pipeline execution/address generation stage to the secondary pipeline store data/memory access stage. The secondary processor pipeline store data path may be configured to forward data from the store data path delay stages to the writeback stage or memory if the load data address matches the address of data in a store data path delay stage. The delay module configured in the secondary processor pipeline store data path may be a one-stage delay buffer.

The store data comparator may be configured to indicate on the output the result of the store data comparator comparing the primary processor pipeline signals and the secondary processor pipeline signals from the respective store data paths. A fault may be indicated if the store data comparator output indicates disagreement between the primary processor pipeline signals and the secondary processor pipeline signals from the respective store data paths. The primary processor pipeline signals and the secondary processor pipeline signals compared by the store data comparator may comprise pipeline internal signals or boundary signals. The processor pipeline signals compared by the store data comparator may comprise handshake signals and data between data cache and core, and handshake signals between data memory and core. The handshake signals and data between data cache and core compared by the store data comparator may comprise request signals, data valid signal, data, data address, and cache hit. The handshake signals between data memory and core compared by the store data comparator may comprise request signal, data valid, data and data address.

The store data path comparator output may be connected to a control gate connected in the primary processor pipeline store data path and a control gate connected in the secondary processor pipeline store data path. The control gate in the primary processor pipeline store data path may be configured to govern primary processor pipeline write operation to the primary processor pipeline store data/memory access stage, determined as a function of the store data path comparator output indication. The store data path comparator output governing primary processor pipeline write operation may indicate fault or no fault. The control gate in the primary processor pipeline store data path may be configured to permit the primary processor pipeline to write data to the primary pipeline store data/memory access stage only when the store data path comparator output indicates no fault is present. The control gate in the secondary processor pipeline store data path may be configured to govern secondary processor pipeline write operation to the secondary processor pipeline store data/memory access stage, determined as a function of the store data path comparator output indication. The store data path comparator output governing secondary processor pipeline write operation may indicate fault or no fault. The control gate in the secondary processor pipeline store data path may be configured to permit the secondary processor pipeline to write data to the secondary pipeline store data/memory access stage only when the store data path comparator output indicates no fault is present.

The fault-tolerant computing system may comprise a writeback comparator. The writeback comparator may have a first input connected through a delay module to the primary processor pipeline to receive delayed primary processor pipeline signals, a second input connected through a delay module to the secondary processor pipeline to receive delayed secondary processor pipeline signals, and an output. The delay module configured to delay the primary processor pipeline signals input to the writeback comparator may be a three-stage delay buffer connected to the primary core store data/memory access stage. The delay module configured to delay the secondary processor pipeline signals input to the writeback comparator may be a one-stage delay buffer connected to the secondary core store data/memory access stage.

The primary processor pipeline writeback data path may be configured with a delay module connecting the primary pipeline store data/memory access stage to the primary processor pipeline writeback stage. The delay module configured in the primary processor pipeline writeback data path may be a three-stage delay buffer. The secondary processor pipeline writeback data path may be configured with a delay module connecting the secondary pipeline store data/memory access stage to the secondary processor pipeline writeback stage. The delay module configured in the primary processor pipeline writeback data path may comprise one or more buffer stage configured with triple module redundancy. The delay module configured in the secondary processor pipeline writeback data path may be a one-stage delay buffer.

The writeback comparator may be configured to indicate on the output the result of the writeback comparator comparing the primary processor pipeline signals and the secondary processor pipeline signals from the respective writeback data paths. A fault may be indicated if the writeback comparator output indicates disagreement between the primary processor pipeline signals and the secondary processor pipeline signals from the respective writeback data paths. The processor pipeline signals compared by the writeback comparator may comprise pipeline internal signals or boundary signals. The processor pipeline signals compared by the writeback comparator may comprise handshake signals and data between register file, data cache, data memory, and core. The handshake signals and data between the register file, data cache, data memory, and core compared by the writeback comparator may comprise data valid, register file ids, data, control register id, data for control register and valid for control register. The register file may have one or more write ports. The number of data handshake signals and data inputs between the register file, data cache, data memory, and core compared by the writeback comparator may be expanded per a multiple of the respective number of register file write ports. In the case of a register file having two write ports, the data handshake signals and data between the register file, data cache, data memory, and core compared by the writeback comparator may comprise two data valid signals, two register file ids, two data inputs, control register id, data for control register and valid for control register. In some implementations, a register file may comprise two write ports, which may be used when the ALU path produces double precision data, or when there is one ALU operation and one Load data operation; however in such case, cache and data memory write is performed one data operation per cycle.

The writeback comparator output may be connected to a control gate connected in the primary processor pipeline writeback path and a control gate connected in the secondary processor pipeline writeback path. The control gate in the primary processor pipeline writeback path may be configured to govern primary processor pipeline writeback operation to the primary processor pipeline cache, determined as a function of the writeback path comparator output indication. The writeback path comparator output governing primary processor pipeline writeback operation may indicate fault or no fault. The control gate in the primary processor pipeline writeback path may be configured to permit the primary processor pipeline to write back data to the primary pipeline cache only when the writeback path comparator output indicates no fault is present. The control gate in the secondary processor pipeline writeback path may be configured to govern secondary processor pipeline writeback operation to the secondary processor pipeline cache, determined as a function of the writeback path comparator output indication. The writeback path comparator output governing secondary processor pipeline writeback operation may indicate fault or no fault. The control gate in the secondary processor pipeline writeback path may be configured to permit the secondary processor pipeline to write back data to the secondary pipeline cache only when the writeback path comparator output indicates no fault is present.

FIG. 1 depicts a block diagram of an exemplary fault-tolerant computing system having delayed lock step execution between primary and secondary processors, a store data path delay, and a writeback path delay, configured to prevent system corruption when a fault is detected based on comparing primary and secondary processor states. In FIG. 1, the system 100 includes the primary core pipeline 105 and the secondary core pipeline 110. In the depicted implementation, the primary core pipeline 105 includes, operably connected in sequence, the primary core fetch stage 115A, the primary core decode stage 120A, the primary core execution (EX)/address generation (AG) stage 125A, the primary core load/store stage 130A, and the primary core writeback stage 135A. In the depicted implementation, the secondary core pipeline 110 includes, operably connected in sequence, the secondary core fetch stage 115B, the secondary core decode stage 120B, the secondary core execution (EX)/address generation (AG) stage 125B, the secondary core load/store stage 130B, and the secondary core writeback stage 135B. In the depicted implementation, the primary core pipeline 105 and the secondary core pipeline 110 execute from a common program store in delayed lock step. In an illustrative example, when data requested by the primary core pipeline 105 is available, the same data will be provided to the secondary core pipeline 110 after two cycle delays. The system 100 may be configured that the primary core pipeline 105 and the secondary core pipeline 110 have separate caches that remain synchronized subject to the lock step delay between the primary core pipeline 105 and the secondary core pipeline 110. For example, the system 100 may be configured that all input/output (I/O) and interrupt signals pass through a single point accessed only by the primary core pipeline 105. In an illustrative example, when there is primary core pipeline 105 I/O, exception, or interrupt activity, the secondary core pipeline 110 will experience the same I/O, exception, or interrupt activity after the delay between the processor pipelines. The length of the delay between the processor pipelines is a design choice and may be any number of cycles.

In the depicted implementation, the store data comparator 140 receives primary core pipeline 105 signals delayed by the primary core store data comparison delay module 145A, and secondary core pipeline 110 signals delayed by the secondary core store data comparison delay module 145B. The store data comparator 140 compares the states of the primary core pipeline 105 and the secondary core pipeline 110 by comparing the delayed primary core pipeline 105 signals and the delayed secondary core pipeline 110 signals. Store data operations in the primary core pipeline 105 and the secondary core pipeline 110 are controlled by the result of comparing the delayed primary core pipeline 105 signals and the delayed secondary core pipeline 110 signals. In the depicted implementation, the primary core pipeline 105 store data path is delayed by the store data path delay module 150A. In the depicted implementation, the secondary core pipeline 110 store data path is delayed by the secondary core store data path delay module 150B.

In the depicted implementation, the writeback comparator 155 receives primary core pipeline 105 signals delayed by the primary core writeback comparison delay module 160A, and secondary core pipeline 110 signals delayed by the secondary core writeback comparison delay module 160B. The writeback comparator 155 compares the states of the primary core pipeline 105 and the secondary core pipeline 110 by comparing the delayed primary core pipeline 105 signals and the delayed secondary core pipeline 110 signals. Writeback operations in the primary core pipeline 105 and the secondary core pipeline 110 are controlled by the result of comparing the delayed primary core pipeline 105 signals and the delayed secondary core pipeline 110 signals. In the depicted implementation, the primary core pipeline 105 writeback path is delayed by the primary core writeback path delay module 165A. In the depicted example, the secondary core pipeline 110 writeback path is delayed by the secondary core writeback path delay module 165B. When a fault is identified based on determining disagreement between the states of primary core pipeline 105 and the secondary core pipeline 110, store data or writeback operation may be blocked while invalid data is in the store data path or writeback delay modules, preventing system state corruption and preserving the integrity of system data in a register file, cache, or memory. As a result of preserving valid system data, the system 100 may be able to restart more quickly from a more recent known clean point.

In the depicted implementation the primary core fetch stage 115A and the secondary core fetch stage 115B read instructions from an instruction memory common to the primary core pipeline 105 and the secondary core pipeline 110. The primary core decode stage 120A and the secondary core decode stage 120B perform instruction decoding comprising parsing operand register sources, determining operation type, and identifying the operation destination. The primary core execution (EX)/address generation (AG) stage 125A and the secondary core execution (EX)/address generation (AG) stage 125B perform the operations based on operands from the respective decode stages and the operand type. The primary core execution (EX)/address generation (AG) stage 125A and the secondary core execution (EX)/ address generation (AG) stage 125B also calculate memory addresses if the operation type is identified as a load/store instruction. The primary core load/store stage 130A and the secondary core load/store stage 130B access the data memory. The primary core writeback stage 135A and the secondary core writeback stage 135B store the load data from memory, or store data from the pipeline into a register file.

Figure 2:
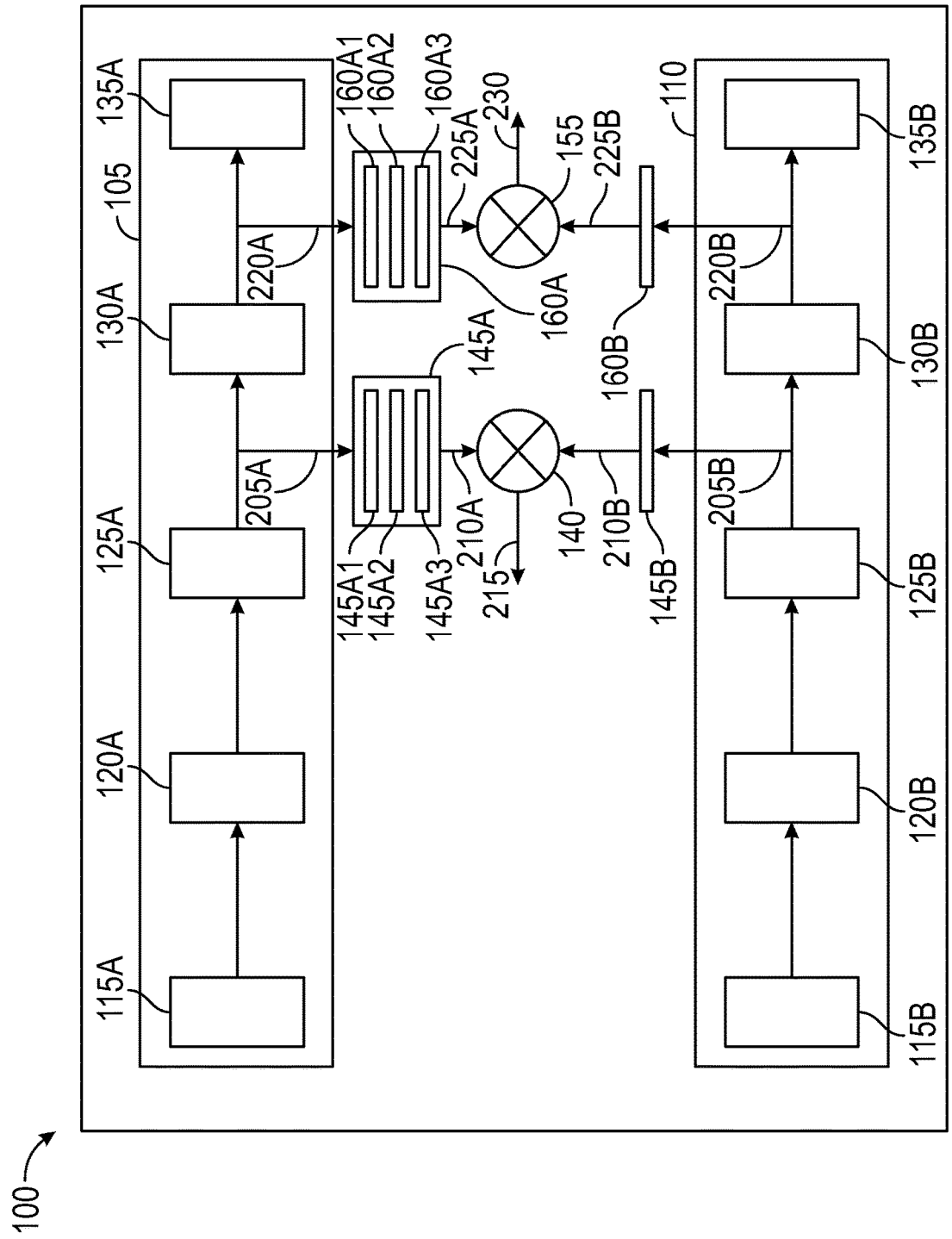
FIG. 2 depicts a block diagram of an exemplary primary processor and secondary processor state comparison design.

FIG. 2 depicts a block diagram of an exemplary primary processor and secondary processor state comparison design. In FIG. 2, the primary core pipeline 105 and the secondary core pipeline 110 are configured to execute a few cycles apart from a common program store. The delay between the primary core pipeline 105 and the secondary core pipeline 110 may be governed by the delays configured in the respective store data path and writeback paths of the primary core pipeline 105 and the secondary core pipeline 110. In an illustrative example, the execution delay between the processor pipelines may be set at system initialization by techniques known in the art of processor system design, such as holding one processor pipeline in reset for a predetermined number of cycles.

In the depicted implementation, the primary core store data comparison delay module 145A includes, operably connected in sequence, the primary core store data comparison delay module stage one 145A1, the primary core store data comparison delay module stage two 145A2, and the primary core store data comparison delay module stage three 145A3. In the depicted implementation, the primary core store data comparison delay module 145A receives the primary core store data comparison signals 205A. In the depicted implementation, the secondary core store data comparison delay module 145B receives the secondary core store data comparison signals 205B. The primary core store data comparison signals 205A and the secondary core store data comparison signals 205B may comprise pipeline internal key signals or key boundary signals, such as, for example, handshake signals and data between data cache and core, and handshake signals between data memory and core. The handshake signals and data between data cache and core may comprise request signals, data valid signal, data, data address, and cache hit result. The handshake signals between data memory and core compared by the store data comparator may comprise, for example, a request signal, data valid, data, or data address. The primary core store data comparison delay module 145A outputs the delayed primary core store data comparison signals 210A delayed by three cycles from the input. The secondary core store data comparison delay module 145B outputs the delayed secondary core store data comparison signals 210B delayed by one cycle from the input. The store data comparator 140 compares the delayed primary core store data comparison signals 210A and the delayed secondary core store data comparison signals 210B. The store data comparator 140 is configured to indicate on the output the resulting store data comparison decision 215.

In the depicted implementation, the primary core writeback comparison delay module 160A includes, operably connected in sequence, the primary core writeback comparison delay module stage one 160A1, the primary core writeback comparison delay module stage two 160A2, and the primary core writeback comparison delay module stage three 160A3. In the depicted implementation, the primary core writeback comparison delay module 160A receives the primary core writeback comparison signals 220A. In the depicted implementation, the secondary core writeback comparison delay module 160B receives the secondary core writeback comparison signals 220B. The primary core writeback comparison signals 220A and the secondary core writeback comparison signals 220B may comprise pipeline internal key signals or key boundary signals, such as, for example, handshake signals and data between a register file, data cache, data memory, and core. The handshake signals and data between the register file, data cache, data memory, and core may comprise data valid, register file ids, data, control register id, data for control register and valid for control register. The primary core writeback comparison delay module 160A outputs the delayed primary core writeback comparison signals 225A delayed by three cycles from the input. The secondary core writeback comparison delay module 160B outputs the delayed secondary core writeback comparison signals 225B delayed by one cycle from the input. The writeback comparator 155 compares the delayed primary core writeback comparison signals 225A and the delayed secondary core writeback comparison signals 225B. The writeback comparator 155 is configured to indicate on the output the resulting writeback comparison decision 230.

Figure 3:
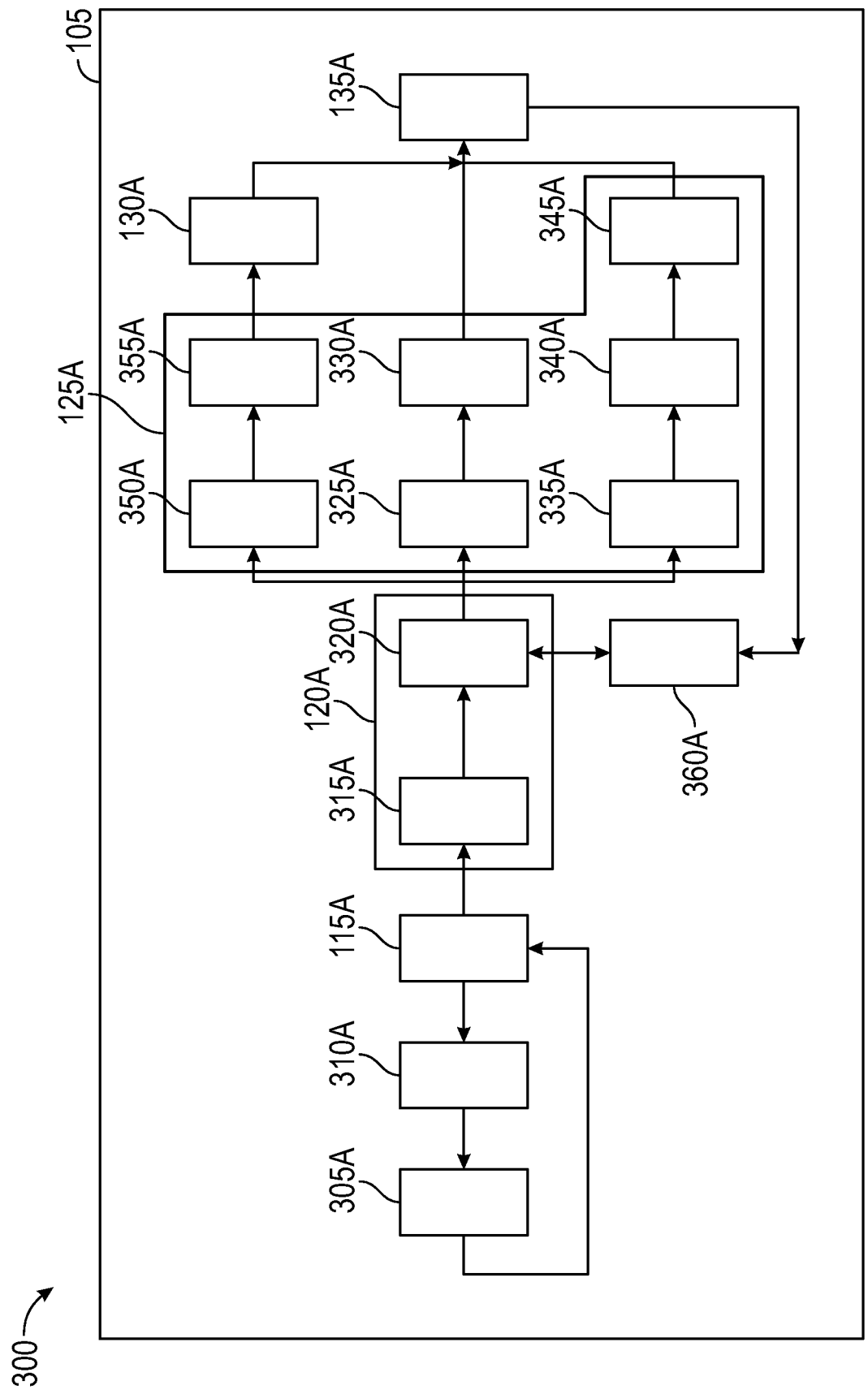
FIG. 3 depicts a block diagram of an exemplary processor pipeline.

FIG. 3 depicts a block diagram of an exemplary processor pipeline. In FIG. 3, the primary core pipeline 105 detail 300 depicts the exemplary primary core pipeline 105 of an exemplary superscalar processor in accordance with various implementations of the present disclosure. In the depicted implementation, the primary core pipeline 105 is configured with one ALU pipe, one load/store pipe, and one floating point pipe to execute instructions, and can fetch up to two 32-bit instructions each cycle. The instructions may be stored into an instruction buffer in one or more fetch block. In the depicted implementation, the primary core fetch stage 115A fetches instructions from the primary core instruction memory (IMEM) 305A based on addresses determined by the primary core instruction memory table look ahead (ITA) 310A. In the depicted implementation, the primary core decode stage 120A includes the primary core decode 120A stage one 315A and the primary core decode 120A stage two 320A. In the depicted implementation, the primary core decode 120A stage one 315A decodes instructions from the instruction fetch buffer and determines which execution pipeline can be used. In the depicted implementation, the primary core decode 120A stage two 320A obtains the necessary operands for the issued instructions. In an illustrative example, if an instruction execution requires a pipeline resource that is unavailable, or an operand that is not available from the primary core register file 360A or the pipeline, then the pipeline needs to wait to execute the instruction until the pipeline resource is available or the operand condition can be fulfilled, resulting in a pipeline stall.

In the depicted implementation, the primary core execution (EX)/address generation (AG) stage 125A includes the primary core execution/address generation stage 125A execution stage one 325A and the primary core execution/address generation stage 125A execution stage two 330A configured in the Arithmetic Logic Unit (ALU) pipe to execute integer arithmetic operations such as multiplication, addition, and subtraction as well as logical and shift operations.

In the depicted implementation, the primary core execution (EX)/address generation (AG) stage 125A includes the primary core execution/address generation stage 125A floating point execution stage one 335A, the primary core execution/address generation stage 125A floating point execution stage two 340A, and the primary core execution/address generation stage 125A floating point execution stage three 345A configured to perform floating point operations in the floating point (FP) pipe. In an illustrative example, floating point operations may require three cycles to be executed by the FP pipe.

In the depicted implementation, the primary core execution (EX)/address generation (AG) stage 125A includes the primary core execution/address generation stage 125A address generation 350A stage and the primary core execution/address generation stage 125A data memory table look ahead (TA) 355A stage configured in the load/store pipe to access a data memory using the primary core load/store stage 130A. The data memory may be a data memory common to the primary core pipeline 105 and a secondary core pipeline 110 (depicted at least in FIG. 1). The primary core execution/address generation stage 125A address generation 350A stage performs address calculations and the primary core execution/address generation stage 125A data memory table look ahead (TA) 355A performs address translation to a physical address from a virtual address calculated by the primary core execution/address generation stage 125A address generation 350A stage. The virtual address is determined as a function of a Memory Management Unit (MMU) configured in the processor. The virtual address is converted to a physical address by the primary core execution/address generation stage 125A data memory table look ahead (TA) 355A stage. The physical address target may be in data cache, or non-cacheable memory. If the operation is a load operation (for example, a read operation from memory), then data is obtained from the data memory using the primary core load/store stage 130A, and the data may be saved into the primary core register file 360A using the primary core writeback stage 135A. If the operation is a store instruction and the data is in memory, the data is stored to the data memory using the primary core load/store stage 130A. If the operation is a store instruction for a cacheable area, then the data is stored into the data cache using the primary core writeback stage 135A.

The primary core pipeline 105 depicted by FIG. 3 illustrates one pipeline of a superscalar processor comprising dual processor pipeline cores. Each of the elements 305A, 310A, 315A, 320A, 325A, 330A, 335A, 340A, 345A, 350A, 355A, and 360A in the primary core pipeline 105 depicted by FIG. 3 have corresponding secondary core pipeline 110 elements 305B, 310B, 315B, 320B, 325B, 330B, 335B, 340B, 345B, 350B, 355B, and 360B depicted at least by FIG. 7. The exemplary superscalar processor may be a dual in-order issue and in-order completion superscalar processor. The superscalar processor may be a RISCV-based multi-thread processor, such as, for example, a C200 processor.

Figure 4:
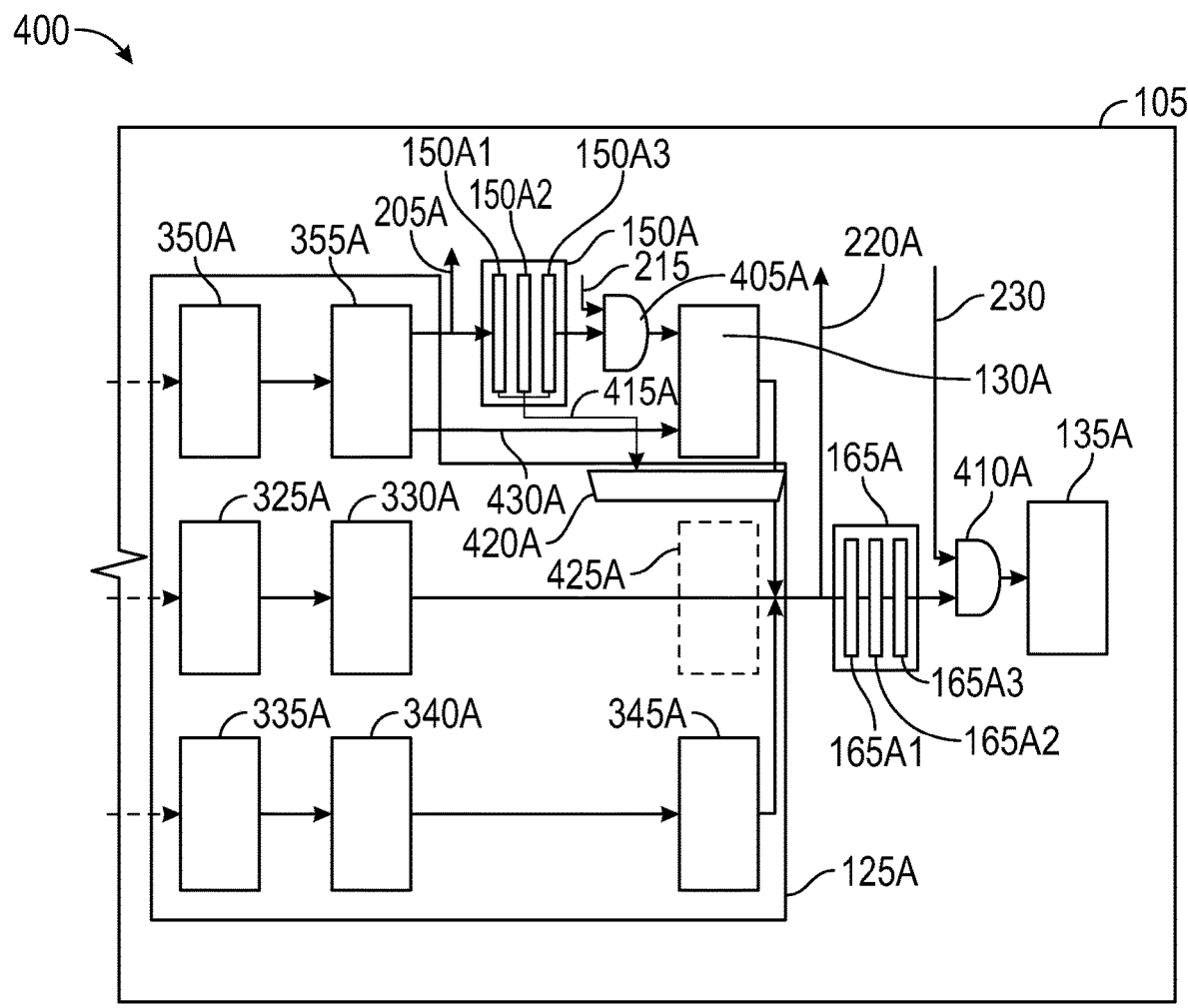
FIG. 4 depicts a block diagram of a portion of a processor pipeline configured with exemplary store data path and writeback path delay modules.

FIG. 4 depicts a block diagram of a portion of a processor pipeline configured with exemplary store data path and writeback path delay modules. In FIG. 4, the primary core pipeline 105 store data and writeback detail 400 depicts a portion of the primary core pipeline 105 depicted by FIG. 1. In the depicted implementation, the primary core store data path delay module 150A includes, operably connected in sequence, the primary core store data path delay module stage one 150A1, the primary core store data path delay module stage two 150A2, and the primary core store data path delay module stage three 150A3. In the depicted implementation, the primary core store data path delay module 150A receives the primary core store data comparison signals 205A and outputs the primary core store data comparison signals 205A delayed by three cycles to the primary core store data control gate 405A. The primary core store data control gate 405A receives the store data comparison decision 215 from a store data comparator 140 (depicted at least in FIG. 2). The primary core store data control gate 405A is configured to output the delayed primary processor pipeline store data path signals to the primary core load/store stage 130A only if the store data comparison decision 215 indicates agreement between the primary processor pipeline state and the secondary processor pipeline state.

In the depicted implementation, the primary core writeback path delay module 165A includes, operably connected in sequence, the primary core writeback path delay module stage one 165A1, the primary core writeback path delay module stage two 165A2, and the primary core writeback path delay module stage three 165A3. In the depicted implementation, the primary core writeback path delay module 165A receives the primary core writeback comparison signals 220A and outputs the primary core writeback comparison signals 220A delayed by three cycles to the primary core writeback control gate 410A. The primary core writeback control gate 410A receives the writeback comparison decision 230 from a writeback comparator 155 (depicted at least in FIG. 2). The primary core writeback control gate 410A is configured to output the delayed primary core writeback comparison signals 220A to the primary core writeback stage 135A only if the writeback comparison decision 230 indicates agreement between the primary processor pipeline state and the secondary processor pipeline state.

The primary core pipeline 105 is configured to forward load data through the primary core load data read path 415A through the primary core load data majority multiplexer 420A to the primary core writeback stage 135A if a cache data address or memory data address matches the address of data in a primary core store data path delay module 150A delay stage. The primary core pipeline 105 is configured to forward store data through the primary core load forward 430A path to memory or to the primary core writeback stage 135A if a load data address matches the address of data in a primary core store data path delay module 150A delay stage. The primary core store data path delay module 150A may be configured with triple module redundancy in multiple buffer stages designed to pass only majority data from each triple redundant buffer stage. The primary core writeback path delay module 165A may be configured with triple module redundancy in multiple buffer stages designed to pass only majority data from each triple redundant buffer stage.

In the depicted implementation, additional primary core dummy pipeline stage 425A is configured as a three-stage delay in the writeback path, to delay data update to the external store or writeback cache until a store data comparator and writeback comparator confirm the primary core and secondary core states are in agreement. When the store data comparator and writeback comparator confirm the primary core and secondary core states are in agreement, update is executed. If the store data comparator and writeback comparator do not confirm the primary core and secondary core states are in agreement, then a fault was detected. If a fault was detected, then the update will be cancelled with all the instructions in the pipeline and an exception will be triggered to the processor. The exception will be a precise exception that will require a period of time that can be precisely and accurately predicted. In this case, the instructions not completed may be cancelled and the Program Counter (PC) of the last-executed instruction may be saved at the exception handling routing. Since fraudulent data was not updated in the processor, the system restart will be very immediate after the trap software logged the malfunctioned point and the PC. In some implementations, the malfunctioned point and the PC may be logged to report the failure, and the failure log may be used to determine if the failure is a permanent failure, based on identifying if the same failure point with the same address in the PC causes the trap again.

The portion of the primary core pipeline 105 depicted by FIG. 4 illustrates one portion of a pipeline of a superscalar processor comprising dual processor pipeline cores. Each of the elements 405A, 410A, 415A, 420A, 425A, and 430A in the portion of the primary core pipeline 105 depicted by FIG. 4 have corresponding secondary core pipeline 110 elements 405B, 410B, 415B, 420B, 425B, and 430B depicted at least by FIG. 7.

Figure 5:
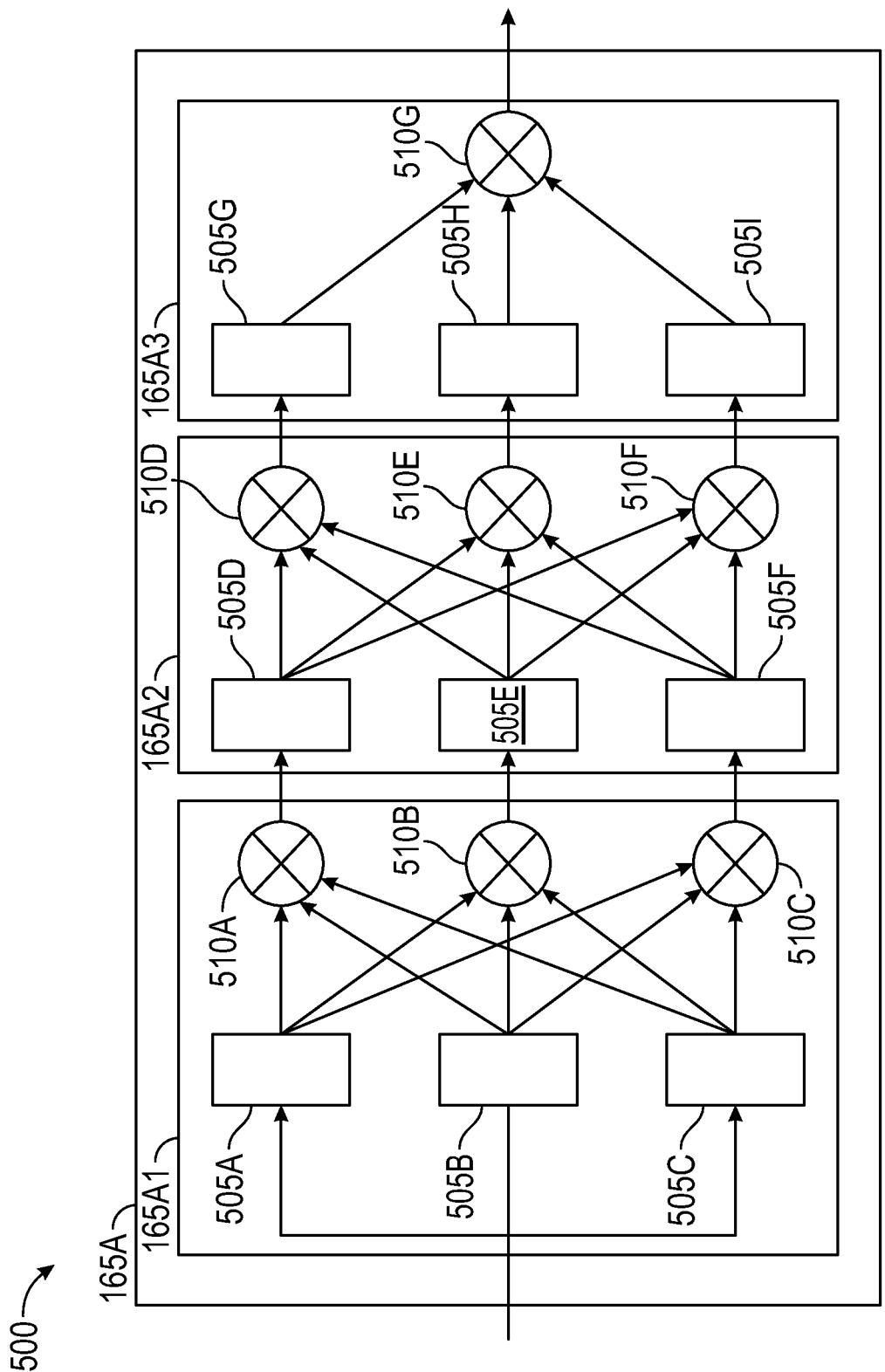
FIG. 5 depicts a block diagram of an exemplary writeback path delay module design.

FIG. 5 depicts a block diagram of an exemplary writeback path delay module design. In FIG. 5, the primary core writeback path delay module 165A detail 500 depicts an exemplary primary core writeback path delay module 165A in a triple module redundancy implementation designed to pass only majority data through each stage. The depicted primary core writeback path delay module 165A includes, operably connected in sequence, the primary core writeback path delay module stage one 165A1, the primary core writeback path delay module stage two 165A2, and the primary core writeback path delay module stage three 165A3. The depicted primary core writeback path delay module stage one 165A1 includes the delay module stage one triple mode redundant module one 505A, the delay module stage one triple mode redundant module two 505B, and the delay module stage one triple mode redundant module three 505C, crossbar connected into the delay module stage one triple mode redundant comparator one 510A, the delay module stage one triple mode redundant comparator two 510B, and the delay module stage one triple mode redundant comparator three 510C. The depicted primary core writeback path delay module stage two 165A2 includes the delay module stage two triple mode redundant module one 505D, the delay module stage two triple mode redundant module two 505E, and the delay module stage two triple mode redundant module three 505F, crossbar connected into the delay module stage two triple mode redundant comparator one 510D, the delay module stage two triple mode redundant comparator two 510E, and the delay module stage two triple mode redundant comparator three 510F. The depicted primary core writeback path delay module stage three 165A3 includes the delay module stage three triple mode redundant module one 505G, the delay module stage three triple mode redundant module two 505H, and the delay module stage three triple mode redundant module three 505I, crossbar connected into the delay module stage three triple mode redundant comparator 510G. In the depicted implementation, data is copied into 3 buffers in each stage and the three values are compared into the next stage. Only the majority data determined by the comparators will be passed to the next stage, to improve data safety by preventing invalid data write to memory or cache if a fault occurs in a store data path delay module or writeback path delay module.

Figure 6:
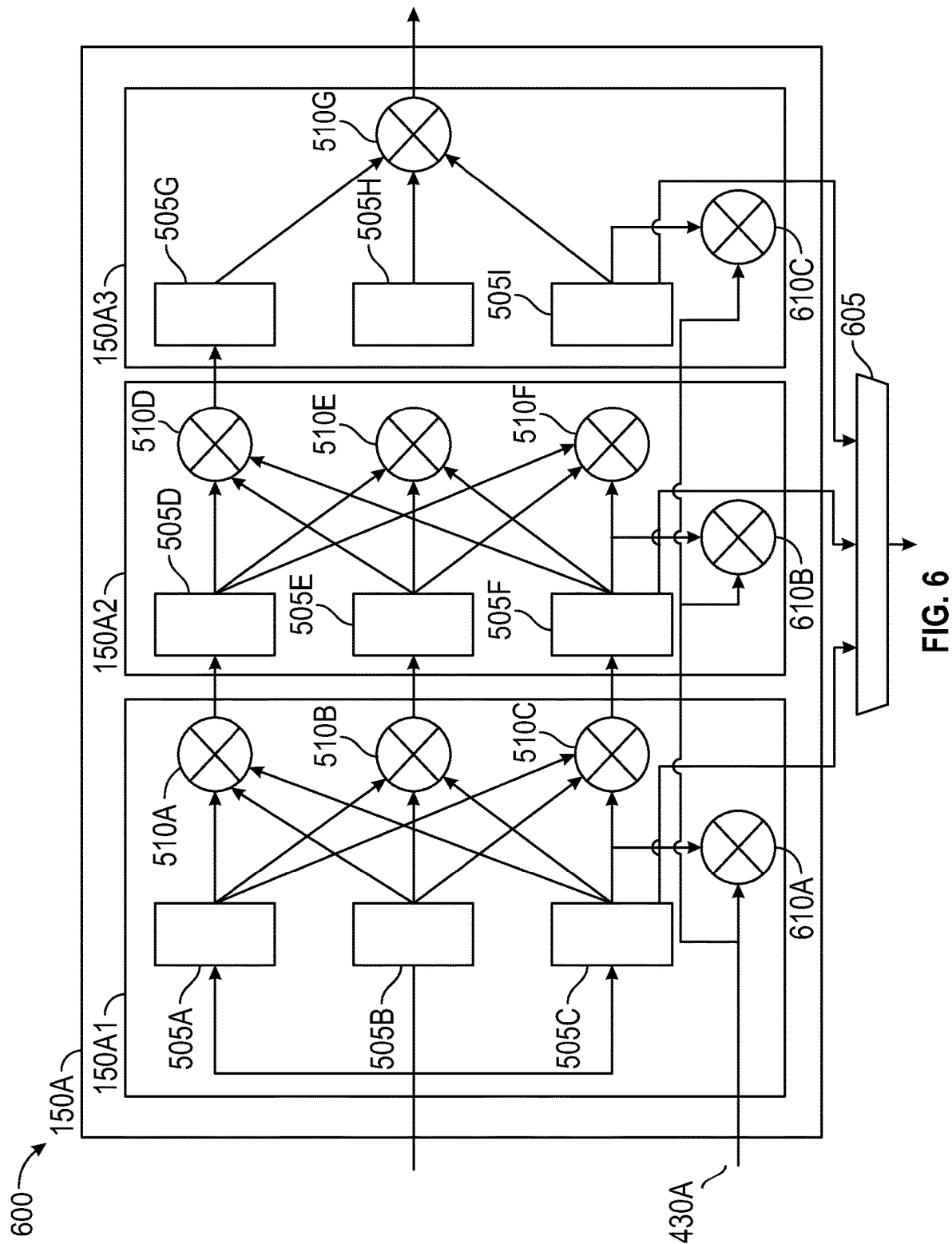
FIG. 6 depicts a block diagram of an exemplary store data path delay module design.

FIG. 6 depicts a block diagram of an exemplary store data path delay module design. In FIG. 6, the primary core store data path delay module 150A detail 600 depicts an exemplary primary core store data path delay module 150A in a triple module redundancy implementation designed to pass only majority data through each stage and forward data from the store data path delay stages to the writeback stage or memory if a load data address matches the address of data in a store data path delay stage. The depicted primary core store data path delay module 150A includes, operably connected in sequence, the primary core store data path delay module stage one 150A1, the primary core store data path delay module stage two 150A2, and the primary core store data path delay module stage three 150A3. In the depicted implementation, the primary core store data path delay module stage one 150A1, the primary core store data path delay module stage two 150A2, and the primary core store data path delay module stage three 150A3 include the triple module redundancy features disclosed with reference to FIG. 5, and also include data forwarding features. In FIG. 6, the primary core store data path delay module 150A includes the primary core store data path delay module triple mode redundant majority multiplexer 605 configured to pass majority data matched in the delay stages by the primary core store data path delay module triple mode redundant stage one comparator 610A, the primary core store data path delay module triple mode redundant stage two comparator 610B, and the primary core store data path delay module triple mode redundant stage three comparator 610C. In an illustrative example, since store data is delayed into memory or data cache as a result of the disclosed delayed lock step fault tolerant system design, data in memory or data cache may be old data and the data in the primary core store data path delay module 150A buffer stages may be newer data. In such a case, if the load data address is matched to the store data in these stages, then the data may be forwarded to the writeback stage, permitting faster recovery from a more recent clean point by preserving the integrity of data in the delay stages.

In an example illustrating a technical effect that may result from using a load data forwarding implementation in accordance with the present disclosure, consider the following execution scenario.

Store R3, R4, 100//Store data in R3 into memory location in R4+100

//In this example, assume R4+100 is equal to R5+200

Load R6, R5, 200//Load data from memory in R5+200 into R6

If a load instruction has to wait until the STORE operation ends and then the LOAD operation is executed, then we don't need data forward. In this case, we have a pipeline stall. However, in a pipeline mode with data forwarding, the pipeline does not need to stall, because the LOAD instruction does not need to wait until STORE ends.

Figure 7:
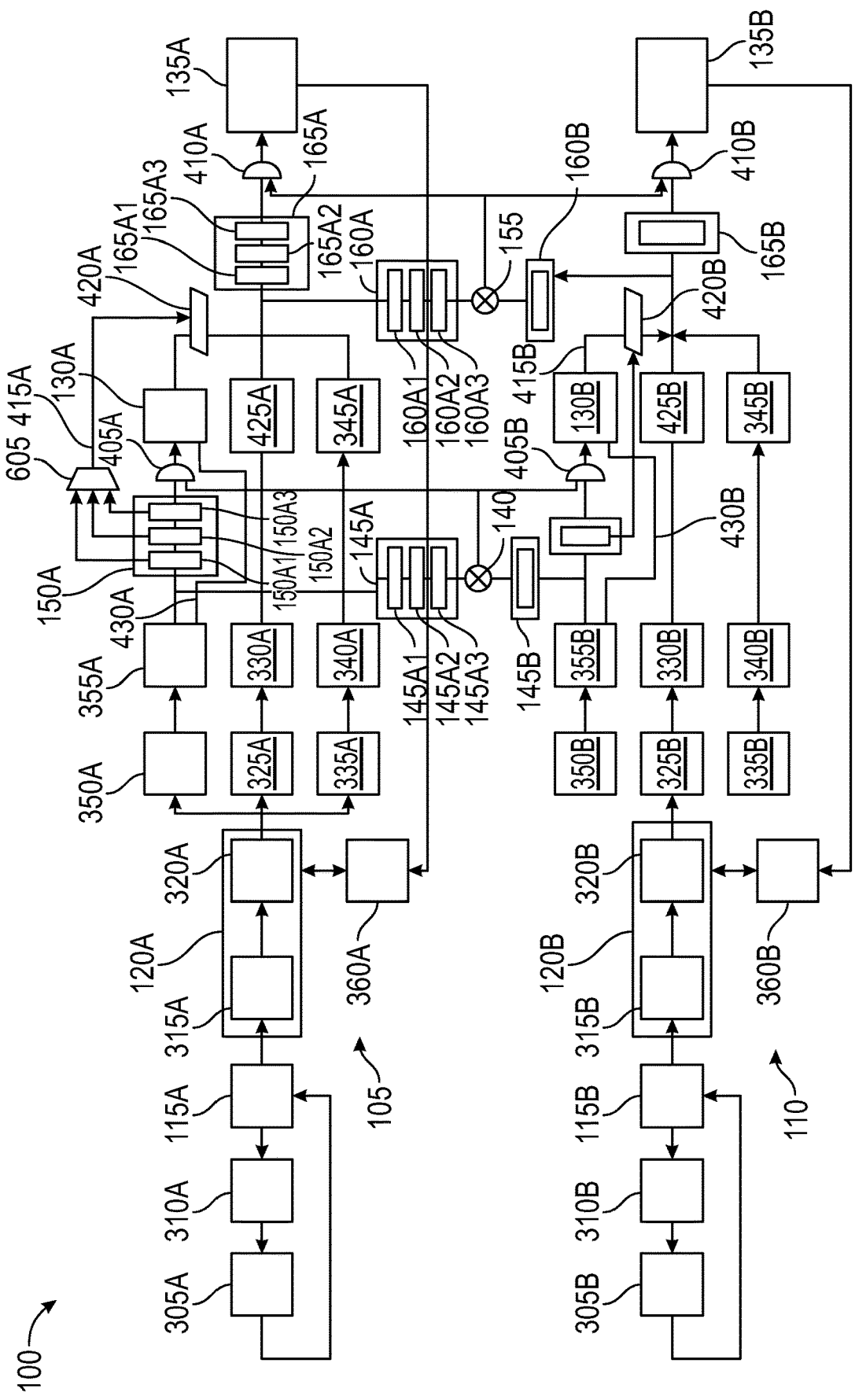
FIG. 7 depicts an exemplary fault-tolerant computing system having delayed lock step execution between primary and secondary processors, a store data path delay, and a writeback path delay configured to prevent system corruption when a fault is detected based on comparing primary and secondary processor states in accordance with the present disclosure.

FIG. 7 depicts an exemplary fault-tolerant computing system having delayed lock step execution between primary and secondary processors, a store data path delay, and a writeback path delay configured to prevent system corruption when a fault is detected based on comparing primary and secondary processor states in accordance with the present disclosure. In FIG. 7, the depicted system 100 includes the primary core pipeline 105 and the secondary core pipeline 110 incorporating the features presented with reference to FIGS. 1-6.

Although various features have been described with reference to the Figures, other features are possible. For example, although the present disclosure has presented implementations based on dual in-order issue and in-order completion processor examples, an implementation in accordance with the present disclosure may also be configured in any processor system having single in-order issue and in-order completion processor structure.

In an illustrative example, fault detection and recovery has been described with reference to delayed lock step designs based on a primary core with three added delay stages and a secondary core having a similar structure but with one added delay stage, such that the secondary core would execute two steps behind the primary core. Thus, the confirmation signal from a store data comparator or writeback comparator would be two cycles earlier in the secondary core. An implementation in accordance with the present disclosure may be configured such that the primary processor executes the same program as the secondary processor, wherein the primary processor executes two cycles ahead of the secondary processor all the time. This is the reason the primary processor is configured with three extra stages and the secondary processor is configured with one extra stage. In an illustrative example of an implementation in accordance with the fast recovery fault-tolerant features disclosed herein, if the number of cycles gap increases between the primary and secondary processors, then the number of extra stages will increase accordingly.

In the Summary above and in this Detailed Description, and the Claims below, and in the accompanying drawings, reference is made to particular features of various implementations. It is to be understood that the disclosure of particular features of various implementations in this specification is to be interpreted to include all possible combinations of such particular features. For example, where a particular feature is disclosed in the context of a particular aspect or implementation, or a particular claim, that feature can also be used—to the extent possible—in combination with and/or in the context of other particular aspects and implementations, and in an implementation generally.

While multiple implementations are disclosed, still other implementations will become apparent to those skilled in the art from this detailed description. Disclosed implementations may be capable of myriad modifications in various obvious aspects, all without departing from the spirit and scope of the disclosed implementations. Accordingly, the drawings and descriptions are to be regarded as illustrative in nature and not restrictive.

It should be noted that the features illustrated in the drawings are not necessarily drawn to scale and features of one implementation may be employed with other implementations as the skilled artisan would recognize, even if not explicitly stated herein. Descriptions of well-known components and processing techniques may be omitted so as to not unnecessarily obscure the implementation features.

Elements described herein as coupled or connected may have an effectual relationship realizable by a direct connection or indirectly with one or more other intervening elements.

In the present disclosure, the term "any" may be understood as designating any number of the respective elements, that is, as designating one, at least one, at least two, each or all of the respective elements. Similarly, the term "any" may be understood as designating any collection(s) of the respective elements, that is, as designating one or more collections of the respective elements, a collection comprising one, at least one, at least two, each or all of the respective elements. The respective collections need not comprise the same number of elements.

While various implementations have been disclosed and described in detail herein, it will be apparent to those skilled in the art that various changes may be made to the disclosed configuration, operation, and form without departing from the spirit and scope thereof. Use of the singular and plural is solely for the sake of illustration and is not to be interpreted as limiting.

The Abstract is provided to comply with 37 C. F. R. § 1.72(b), to allow the reader to quickly ascertain the nature of the technical disclosure and is submitted with the understanding that it will not be used to interpret or limit the scope or meaning of the claims.

In the present disclosure, all descriptions where "comprising" is used may have as alternatives "consisting essentially of," or "consisting of." In the present disclosure, any method or apparatus implementation may be devoid of one or more process steps or components. In the present disclosure, implementations employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an implementation "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The terms "abutting" or "in mechanical union" refer to items that are in direct physical contact with each other, although the items may not necessarily be attached together.

The word "exemplary" is used herein to mean "serving as an example, instance, or illustration." Any implementation described herein as "exemplary" is not necessarily to be construed as preferred over other implementations. While various aspects of the disclosure are presented with reference to drawings, the drawings are not necessarily drawn to scale unless specifically indicated.

Reference throughout this specification to "an implementation" or "the implementation" means that a particular feature, structure, or characteristic described in connection with that implementation is included in at least one implementation. Thus, the quoted phrases, or variations thereof, as recited throughout this specification are not necessarily all referring to the same implementation.

Similarly, it should be appreciated that in the above description, various features are sometimes grouped together in a single implementation, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed implementation. Thus, the claims following this Detailed Description are hereby expressly incorporated into this Detailed Description, with each claim standing on its own as a separate implementation. This disclosure is intended to be interpreted as including all permutations of the independent claims with their dependent claims.

Throughout this disclosure and elsewhere, block diagrams or flowchart illustrations may depict methods, apparatuses (i.e., systems), and computer program products. Each element of the block diagrams or flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an implementation may include an alternate order of the steps adapted to a particular application of a technique disclosed herein. All such variations and modifications are intended to fall within the scope of this disclosure. The depiction and description of steps in any particular order is not intended to exclude implementations having the steps in a different order, unless required by a particular application, explicitly stated, or otherwise clear from the context.

Traditionally, a computer program consists of a sequence of computational instructions or program instructions. It will be appreciated that a programmable apparatus (that is, computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable, and replaceable, or fixed. It will also be understood that a computer can include a Basic Input/Output System (BIOS), firmware, an operating system, a database, or the like that can include, interface with, or support the software and hardware described herein.

Implementations of the system as described herein are not limited to applications involving conventional computer programs or programmable apparatuses that run them. It is contemplated, for example, that implementations of the disclosure as claimed herein could include an optical computer, quantum computer, analog computer, or the like.

Unless explicitly stated or otherwise clear from the context, the verbs "execute" and "process" are used interchangeably to indicate execute, process, interpret, compile, assemble, link, load, any and all combinations of the foregoing, or the like. Therefore, implementations that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, implementations of the disclosure are not described with reference to any particular programming language. It is appreciated that a variety of programming languages may be used to implement the present teachings as described herein, and any references to specific languages are provided for disclosure of enablement and best mode of implementations of the disclosure. Implementations of the disclosure are well suited to a wide variety of computer or network systems over numerous topologies. Within this field, the configuration and management of large systems includes storage devices and computers that are communicatively coupled to dissimilar computers and storage devices over a network, such as the Internet.

The respective reference numbers and descriptions of the elements depicted by the Drawings are summarized as follows.

- 100 system
- 105 primary core pipeline
- 110 secondary core pipeline
- 115A primary core fetch stage
- 115B secondary core fetch stage
- 120A primary core decode stage
- 120B secondary core decode stage
- 125A primary core execution (EX)/address generation (AG) stage
- 125B secondary core execution (EX)/address generation (AG) stage
- 130A primary core load/store stage
- 130B secondary core load/store stage
- 135A primary core writeback stage
- 135B secondary core writeback stage
- 140 store data comparator
- 145A primary core store data comparison delay module
- 145A1 primary core store data comparison delay module stage one
- 145A2 primary core store data comparison delay module stage two
- 145A3 primary core store data comparison delay module stage three
- 145B secondary core store data comparison delay module
- 150A primary core store data path delay module
- 150A1 primary core store data path delay module stage one 150A2 primary core store data path delay module stage two
150A3 primary core store data path delay module stage three
150B secondary core store data path delay module
155 writeback comparator
160A primary core writeback comparison delay module
160A1 primary core writeback comparison delay module stage one
160A2 primary core writeback comparison delay module stage two
160A3 primary core writeback comparison delay module stage three
160B secondary core writeback comparison delay module
165A primary core writeback path delay module
165A1 primary core writeback path delay module stage one
165A2 primary core writeback path delay module stage two
165A3 primary core writeback path delay module stage three
165B secondary core writeback path delay module
205A primary core store data comparison signals
205B secondary core store data comparison signals
210A delayed primary core store data comparison signals
210B delayed secondary core store data comparison signals
215 store data comparison decision
220A primary core writeback comparison signals
220B secondary core writeback comparison signals
225A delayed primary core writeback comparison signals
225B delayed secondary core writeback comparison signals
230 writeback comparison decision
300 primary core pipeline 105 detail
305A primary core instruction memory (IVIEM)
305B secondary core instruction memory (IMEM)
310A primary core instruction memory table look ahead (ITA)
310B secondary core instruction memory table look ahead (ITA)
315A primary core decode 120A stage one
315B secondary core decode 120B stage one
320A primary core decode 120A stage two
320B secondary core decode 120B stage two
325A primary core execution/address generation stage 125A execution stage one
325B secondary core execution/address generation stage 125B execution stage one
330A primary core execution/address generation stage 125A execution stage two
330B secondary core execution/address generation stage 125B execution stage two
335A primary core execution/address generation stage 125A floating point execution stage one
335B secondary core execution/address generation stage 125B floating point execution stage one
340A primary core execution/address generation stage 125A floating point execution stage two
340B secondary core execution/address generation stage 125B floating point execution stage two
345A primary core execution/address generation stage 125A floating point execution stage three
345B secondary core execution/address generation stage 125B floating point execution stage three
350A primary core execution/address generation stage 125A address generation
350B secondary core execution/address generation stage 125B address generation
355A primary core execution/address generation stage 125A data memory table look ahead (TA)
355B secondary core execution/address generation stage 125B data memory table look ahead (TA)
360A primary core register file
360B secondary core register file
400 primary core pipeline 105 store data and writeback detail
405A primary core store data control gate
405B secondary core store data control gate
410A primary core writeback control gate
410B secondary core writeback control gate
415A primary core load data read path
415B secondary load data read path
420A primary core load data majority multiplexer
420B secondary core load data majority multiplexer
425A primary core dummy pipeline stage
425B secondary core dummy pipeline stage
430A primary core load forward
430B secondary core load forward
500 primary core writeback path delay module 165A detail
505A delay module stage one triple mode redundant module one
505B delay module stage one triple mode redundant module two
505C delay module stage one triple mode redundant module three
505D delay module stage two triple mode redundant module one
505E delay module stage two triple mode redundant module two
505F delay module stage two triple mode redundant module three
505G delay module stage three triple mode redundant module one
505H delay module stage three triple mode redundant module two
505I delay module stage three triple mode redundant module three
510A delay module stage one triple mode redundant comparator one
510B delay module stage one triple mode redundant comparator two
510C delay module stage one triple mode redundant comparator three
510D delay module stage two triple mode redundant comparator one
510E delay module stage two triple mode redundant comparator two
510F delay module stage two triple mode redundant comparator three
510G delay module stage three triple mode redundant comparator
600 primary core store data path delay module 150A detail
605 primary core store data path delay module triple mode redundant majority multiplexer
610A primary core store data path delay module triple mode redundant stage one comparator
610B primary core store data path delay module triple mode redundant stage two comparator
610C primary core store data path delay module triple mode redundant stage three comparator A number of implementations have been described. Nevertheless, it will be understood that various modifications may be made. For example, the steps of the disclosed techniques may be performed in a different sequence, components of the disclosed systems may be combined in a different manner, or the components may be supplemented with other components. Accordingly, other implementations are contemplated, within the scope of the following claims.

What is claimed is:

1. An apparatus comprising:
a primary processor comprising a primary processor pipeline, wherein the primary processor pipeline comprises an execute stage and a load/store stage;
a secondary processor comprising a secondary processor pipeline, wherein the secondary processor pipeline comprises an execute stage and a load/store stage;
a store data comparator having a first input operably coupled with the primary processor pipeline, a second input operably coupled with the secondary processor pipeline, and an output, wherein the store data comparator is configured to indicate at the output a result of comparing delayed primary processor pipeline signals with delayed secondary processor pipeline signals;
a primary processor pipeline store data control gate configured to output delayed primary processor pipeline signals to the primary processor pipeline load/store stage only if the store data comparator output indicates agreement between the delayed primary processor pipeline signals and the delayed secondary processor pipeline signals compared by the store data comparator; and
a secondary processor pipeline store data control gate configured to output delayed secondary processor pipeline signals to the secondary processor pipeline load/store stage only if the store data comparator output indicates agreement between the delayed primary processor pipeline signals and the delayed secondary processor pipeline signals compared by the store data comparator;
wherein the primary processor pipeline execute stage has an output operably connected through a primary processor pipeline store data path delay module to a first input of the primary processor store data control gate; and
the primary processor pipeline store data path delay module is a three-stage triple module redundancy buffer delay module wherein each stage is configured to pass only majority data.

2. The apparatus of claim 1, wherein the primary processor pipeline further comprises a writeback stage, and wherein the primary processor pipeline is configured to forward data from the primary processor pipeline store data path delay module to the writeback stage if a load data address matches the address of data in the primary processor pipeline store data path delay module.

3. The apparatus of claim 1, wherein the secondary processor pipeline execute stage has an output operably connected through a secondary processor pipeline store data path delay module to a first input of the secondary processor store data control gate.

4. The apparatus of claim 3, wherein the secondary processor pipeline store data path delay module is a one-stage buffer delay module.

5. The apparatus of claim 1, wherein the delayed primary processor pipeline signals compared by the store data comparator are connected to the store data comparator first input through a primary processor store data comparison delay module operably coupled to the primary processor pipeline execute stage.

6. The apparatus of claim 5, wherein the primary processor store data comparison delay module is a three-stage buffer delay module.

7. An apparatus comprising:
a primary processor comprising a primary processor pipeline, wherein the primary processor pipeline comprises, operably connected in sequence, a fetch stage, a decode stage, an execute stage, a load/store stage, and a writeback stage;
a secondary processor comprising a secondary processor pipeline, wherein the secondary processor pipeline comprises, operably connected in sequence, a fetch stage, a decode stage, an execute stage, a load/store stage, and a writeback stage;
a store data comparator having a first input operably coupled with an output of the primary processor pipeline execute stage to receive delayed primary processor pipeline signals through a primary processor store data comparison delay module comprising a three-stage buffer delay, a second input operably coupled with the secondary processor pipeline execute stage to receive delayed secondary processor pipeline signals through a secondary processor store data comparison delay module comprising a one-stage buffer delay, and an output, wherein the store data comparator is configured to indicate at the output a result of comparing the delayed primary processor pipeline signals with the delayed secondary processor pipeline signals;
a primary processor pipeline store data control gate having a first input, a second input, and an output, wherein the first input is operably coupled with an output of the primary processor pipeline execute stage to receive delayed primary processor pipeline signals through a primary processor store data path delay module comprising a three-stage buffer delay, wherein the second input is operably coupled with the store data comparator output, and the primary processor pipeline store data control gate is configured to output the delayed primary processor pipeline store data path signals to the primary processor pipeline load/store stage only if the store data comparator output indicates agreement between the delayed primary processor pipeline signals and the delayed secondary processor pipeline signals compared by the store data comparator, and wherein the primary processor pipeline is configured to forward data from the primary processor pipeline store data path delay module to the writeback stage or a memory if a load data address matches the address of data in the primary processor pipeline store data path delay module;
a secondary processor pipeline store data control gate having a first input, a second input, and an output, wherein the first input is operably coupled with an output of the secondary processor pipeline execute stage to receive delayed secondary processor pipeline signals through a secondary processor store data path delay module comprising a one-stage buffer delay, wherein the second input is operably coupled with the store data comparator output, and the secondary processor pipeline store data control gate is configured to output the delayed secondary processor pipeline store data path signals to the secondary processor pipeline load/store stage only if the store data comparator output indicates agreement between the delayed primary processor pipeline signals and the delayed secondary processor pipeline signals compared by the store data comparator, and wherein the secondary processor pipeline is configured to forward data from the secondary processor pipeline store data path delay module to the writeback stage or a memory if a load data address matches the address of data in the secondary processor pipeline store data path delay module;

a writeback comparator having a first input operably coupled with an output of the primary processor pipeline load/store stage to receive delayed primary processor pipeline signals through a primary processor writeback comparison delay module comprising a three-stage buffer delay, a second input operably coupled with the secondary processor pipeline load/store stage to receive delayed secondary processor pipeline signals through a secondary processor writeback comparison delay module comprising a one-stage buffer delay, and an output, and wherein the writeback comparator is configured to indicate at the output a result of comparing the delayed primary processor pipeline signals with the delayed secondary processor pipeline signals;

a primary processor pipeline writeback control gate having a first input, a second input, and an output, wherein the first input is operably coupled with an output of the primary processor pipeline load/store stage to receive delayed primary processor pipeline signals through a primary processor writeback path delay module comprising a three-stage buffer delay, and wherein the second input is operably coupled with the writeback comparator output, and the primary processor pipeline writeback control gate is configured to output the delayed primary processor pipeline writeback signals to the primary processor pipeline writeback stage only if the writeback comparator output indicates agreement between the delayed primary processor pipeline signals and the delayed secondary processor pipeline signals compared by the writeback comparator; and a secondary processor pipeline writeback control gate having a first input, a second input, and an output, wherein the first input is operably coupled with an output of the secondary processor pipeline load/store stage to receive delayed secondary processor pipeline signals through a secondary processor writeback path delay module comprising a one-stage buffer delay, and wherein the second input is operably coupled with the writeback comparator output, and the secondary processor pipeline writeback control gate is configured to output the delayed secondary processor pipeline writeback signals to the secondary processor pipeline writeback stage only if the writeback comparator output indicates agreement between the delayed primary processor pipeline signals and the delayed secondary processor pipeline signals compared by the writeback comparator.

8. The apparatus of claim 7, wherein the primary processor pipeline fetch stage and the secondary processor pipeline fetch stage are operably coupled to a program store common to the primary processor and the secondary processor.

9. The apparatus of claim 7, wherein the secondary processor pipeline executes in delayed lock step with the primary processor pipeline, wherein the secondary processor pipeline execution is delayed from the primary processor pipeline execution by at least two cycles.

10. The apparatus of claim 7, wherein the delayed primary processor pipeline signals and the delayed secondary processor pipeline signals compared by the store data comparator further comprise handshake signals and data between a data cache and a core, or handshake signals between a data memory and the core.

11. The apparatus of claim 7, wherein the delayed primary processor pipeline signals and the delayed secondary processor pipeline signals compared by the writeback comparator further comprise handshake signals and data between a register file, a data cache, a data memory, and a core.

12. The apparatus of claim 7, wherein the primary processor pipeline store data path delay module further comprises a three-stage triple module redundancy buffer delay module wherein each stage is configured to pass only majority data.

13. The apparatus of claim 7, wherein the primary processor pipeline writeback path delay module further comprises a three-stage triple module redundancy buffer delay module wherein each stage is configured to pass only majority data.

14. An apparatus comprising: a primary processor comprising a primary processor pipeline, wherein the primary processor pipeline comprises, operably connected in sequence, a fetch stage, a decode stage, an execute stage, a load/store stage, and a writeback stage;

a secondary processor comprising a secondary processor pipeline, wherein the secondary processor pipeline comprises, operably connected in sequence, a fetch stage, a decode stage, an execute stage, a load/store stage, and a writeback stage, wherein the primary processor pipeline fetch stage and the secondary processor pipeline fetch stage are operably coupled to a program store common to the primary processor and the secondary processor;

a store data comparator having a first input operably coupled with an output of the primary processor pipeline execute stage to receive delayed primary processor pipeline signals through a primary processor store data comparison delay module comprising a three-stage buffer delay, a second input operably coupled with the secondary processor pipeline execute stage to receive delayed secondary processor pipeline signals through a secondary processor store data comparison delay module comprising a one-stage buffer delay, and an output, wherein the store data comparator is configured to indicate at the output a result of comparing the delayed primary processor pipeline signals with the delayed secondary processor pipeline signals, and wherein the delayed primary processor pipeline signals and the delayed secondary processor pipeline signals compared by the store data comparator further comprise handshake signals and data between a data cache and a core, and handshake signals between a data memory and the core;

a primary processor pipeline store data control gate having a first input, a second input, and an output, wherein the first input is operably coupled with an output of the primary processor pipeline execute stage to receive delayed primary processor pipeline signals through a primary processor store data path delay module comprising a three-stage triple module redundancy buffer delay wherein each stage is configured to pass only majority data, wherein the second input is operably coupled with the store data comparator output, and the primary processor pipeline store data control gate is configured to output the delayed primary processor pipeline store data path signals to the primary processor pipeline load/store stage only if the store data comparator output indicates agreement between the delayed primary processor pipeline signals and the delayed secondary processor pipeline signals compared by the store data comparator, and wherein the primary processor pipeline is configured to forward data from the primary processor pipeline store data path delay module to the writeback stage if a load data address matches the address of data in the primary processor pipeline store data path delay module buffer stages;

a secondary processor pipeline store data control gate having a first input, a second input, and an output, wherein the first input is operably coupled with an output of the secondary processor pipeline execute stage to receive delayed secondary processor pipeline signals through a secondary processor store data path delay module comprising a one-stage buffer delay, wherein the second input is operably coupled with the store data comparator output, and the secondary processor pipeline store data control gate is configured to output the delayed secondary processor pipeline store data path signals to the secondary processor pipeline load/store stage only if the store data comparator output indicates agreement between the delayed primary processor pipeline signals and the delayed secondary processor pipeline signals compared by the store data comparator, and wherein the secondary processor pipeline is configured to forward data from the secondary processor pipeline store data path delay module to the writeback stage if a load data address matches the address of data in the secondary processor pipeline store data path delay module;

a writeback comparator having a first input operably coupled with an output of the primary processor pipeline load/store stage to receive delayed primary processor pipeline signals through a primary processor writeback comparison delay module comprising a three-stage buffer delay, a second input operably coupled with the secondary processor pipeline load/store stage to receive delayed secondary processor pipeline signals through a secondary processor writeback comparison delay module comprising a one-stage buffer delay, and an output, and wherein the writeback comparator is configured to indicate at the output the result of comparing the delayed primary processor pipeline signals with the delayed secondary processor pipeline signals, and wherein the delayed primary processor pipeline signals and the delayed secondary processor pipeline signals compared by the writeback comparator further comprise handshake signals and data between a register file, a data cache, a data memory, and a core;

a primary processor pipeline writeback control gate having a first input, a second input, and an output, wherein the first input is operably coupled with an output of the primary processor pipeline load/store stage to receive delayed primary processor pipeline signals through a primary processor writeback path delay module comprising a three-stage triple module redundancy buffer delay wherein each stage is configured to pass only majority data, and wherein the second input is operably coupled with the writeback comparator output, and the primary processor pipeline writeback control gate is configured to output the delayed primary processor pipeline writeback signals to the primary processor pipeline writeback stage only if the writeback comparator output indicates agreement between the delayed primary processor pipeline signals and the delayed secondary processor pipeline signals compared by the writeback comparator; and a secondary processor pipeline writeback control gate having a first input, a second input, and an output, wherein the first input is operably coupled with an output of the secondary processor pipeline load/store stage to receive delayed secondary processor pipeline signals through a secondary processor writeback path delay module comprising a one-stage buffer delay, and wherein the second input is operably coupled with the writeback comparator output, and the secondary processor pipeline writeback control gate is configured to output the delayed secondary processor pipeline writeback signals to the secondary processor pipeline writeback stage only if the writeback comparator output indicates agreement between the delayed primary processor pipeline signals and the delayed secondary processor pipeline signals compared by the writeback comparator.

15. The apparatus of claim 14, wherein the program store further comprises processor executable instructions configured to cause the apparatus to resume execution from a known clean program point in response to a fault indication determined as a function of disagreement between primary processor pipeline signals and secondary processor pipeline signals.

16. The apparatus of claim 14, wherein one or more of the primary processor or the secondary processor further comprise a superscalar processor.

17. The apparatus of claim 14, wherein the apparatus further comprises a C200 processor.

* * * * *